United States Patent
Sonu

(10) Patent No.: US 6,459,851 B1
(45) Date of Patent: Oct. 1, 2002

(54) APPARATUS FOR PROCESSING AUDIO AND VIDEO DVD DATA

(75) Inventor: Gene Sonu, San Jose, CA (US)

(73) Assignee: Oak Technology, Inc., Sunnyvale, CA (US)

(*) Notice: Subject to any disclaimer, the term of this patent is extended or adjusted under 35 U.S.C. 154(b) by 0 days.

(21) Appl. No.: 09/222,186

(22) Filed: Dec. 29, 1998

(51) Int. Cl.[7] ................................................ H04N 7/64
(52) U.S. Cl. .................... 386/116; 386/125; 369/53.35; 714/799; 714/819
(58) Field of Search .......................... 386/40, 45, 21, 386/116, 124, 125–126; 369/30.04, 30.07, 30.08, 30.09, 53.35, 94; 714/799, 819

(56) References Cited

U.S. PATENT DOCUMENTS

| | | | | |
|---|---|---|---|---|
| 5,572,558 A | * | 11/1996 | Beherns | 375/376 |
| 5,719,843 A | * | 2/1998 | Nakajima et al. | 369/59 |
| 5,808,994 A | * | 9/1998 | Tanaka et al. | 369/59 |
| 5,940,416 A | * | 8/1999 | Nishiya et al. | 714/795 |
| 6,078,444 A | * | 6/2000 | Vishakhadatta et al. | 360/32 |
| 6,246,723 B1 | * | 6/2001 | Bliss et al. | 375/265 |
| 6,317,471 B1 | * | 11/2001 | Horigome et al. | 375/341 |

* cited by examiner

Primary Examiner—Andrew Christensen
Assistant Examiner—Po-lin Chieu
(74) Attorney, Agent, or Firm—Phil McKay

(57) ABSTRACT

An apparatus for processing a digitized analog signal read from a DVD media and provided to a digital processing system is described herein. The apparatus includes a DVD reading apparatus for providing a signal comprised of a stream of actual data read from a DVD media; and a processor for determining, based upon the comparison of actual data to the known ideal contents of the data on said DVD media, the magnitude of no more than two variables representing at least three coefficients in an impulse response equation which models the digital processing system. The magnitude of the two variables are determined by the processor so that the error rate between the first and second sets of data is minimized.

10 Claims, 5 Drawing Sheets

APPARATUS FOR PROCESSING AUDIO AND VIDEO DVD DATA

CROSS-REFERENCE TO RELATED APPLICATIONS

This application is relates to copending U.S. patent application Ser. No. 09/222,231, filed on even date herewith, entitled METHOD FOR PROCESSING AUDIO AND VIDEO DATA and naming Gene Sonu as inventor, the application being incorporated herein by reference in its entirety.

BACKGROUND OF THE INVENTION

1. Field of the Invention

The present invention relates to electronic systems employing CD-ROM or DVD readers as read-only storage devices. More particularly, the present invention relates to a method and apparatus for reducing or eliminating read errors from such storage devices.

2. The Background Art

Modem electronic systems such as video playback machines and computers often employ Compact Disk Read-Only Memory (CDROM) media or DVD media for storing large amounts of data such as video or audio data.

In the remainder of this specification, the acronyms CDROM and DVD will be grouped together, and commonly referred to as DVD's, since the subject matter of this disclosure applies equally to both types of systems.

Typically, DVD's are the storage media utilized for marketing video and audio products, as well as complex software systems. When a user purchases the product, the user mounts the DVD into a player or reader designed to read the information stored therein, and then causes the read process to begin.

DVD's store information in digital form, resulting in data that is either a one (1) or a zero (0). Depending on the encoding scheme used when writing the DVD, certain sequences of one's and zeros are not allowed. For example, in the (2,10) encoding scheme, there must be no less than two consecutive zeros, and there must not be more than 10 consecutive zeros.

Reading and evaluating information stored on a DVD involves a concept called Partial Response Maximum Likelihood (PRML). Briefly, the impulse response of the target read channel is typically described by $$H(D)=a+b(D)+c(D^2)+d(D^3) \qquad (R.\ 1)$$

where a, b, c, and d are coefficients in the relationship.

In prior art systems, these coefficients a, b, c, and d are values which are determined when a test data sequence is read from the DVD when the DVD is first placed in the reader. The values of these coefficients are determined by reading the known test sequence, and then computing the target response many times, using different values substituted for each variable, in order to determine the proper values to use when reading actual data.

While suitable for its intended purposes, the prior art systems must compute the values of four coefficients to minimize the error between the target response and the real system response. The computation of four coefficients takes time and requires complex hardware to accomplish.

Further, prior art systems use threshold detection which allows for wandering of the baseline signal, introducing errors which are caused by the decoding scheme, rather than by the actual read process itself. As DVD speeds increase, tracking the baseline becomes more difficult, and the error rate increases.

It would thus be beneficial to provide a DVD system which requires the computation of fewer variables, thus minimizing the time required to calibrate the system when a new DVD is inserted into the system.

According to a first principle of the present invention, a method is provided for analyzing data read from DVD storage media. According to a second principle of the present invention, a method is provided which minimizes read errors in data read from DVD storage media. According to a third principle of the present invention, a method is provided for performing a difference metric calculation on data read from a DVD storage media.

SUMMARY OF THE INVENTION

An apparatus for processing a digitized analog signal read from a DVD media and provided to a digital processing system is described herein. The apparatus includes a DVD reading apparatus for providing a signal comprised of a stream of actual data read from a DVD media; and a processor for determining, based upon the comparison of actual data to the known ideal contents of the data on said DVD media, the magnitude of no more than two variables representing at least three coefficients in an impulse response equation which models the digital processing system. The magnitude of the two variables are determined by the processor so that the error rate between the first and second sets of data is minimized.

DETAILED DESCRIPTION OF AN EMBODIMENT

Those of ordinary skill in the art will realize that the following description of the present invention is illustrative only and not in any way limiting. Other embodiments of the invention will readily suggest themselves to such skilled persons.

Figure 1:
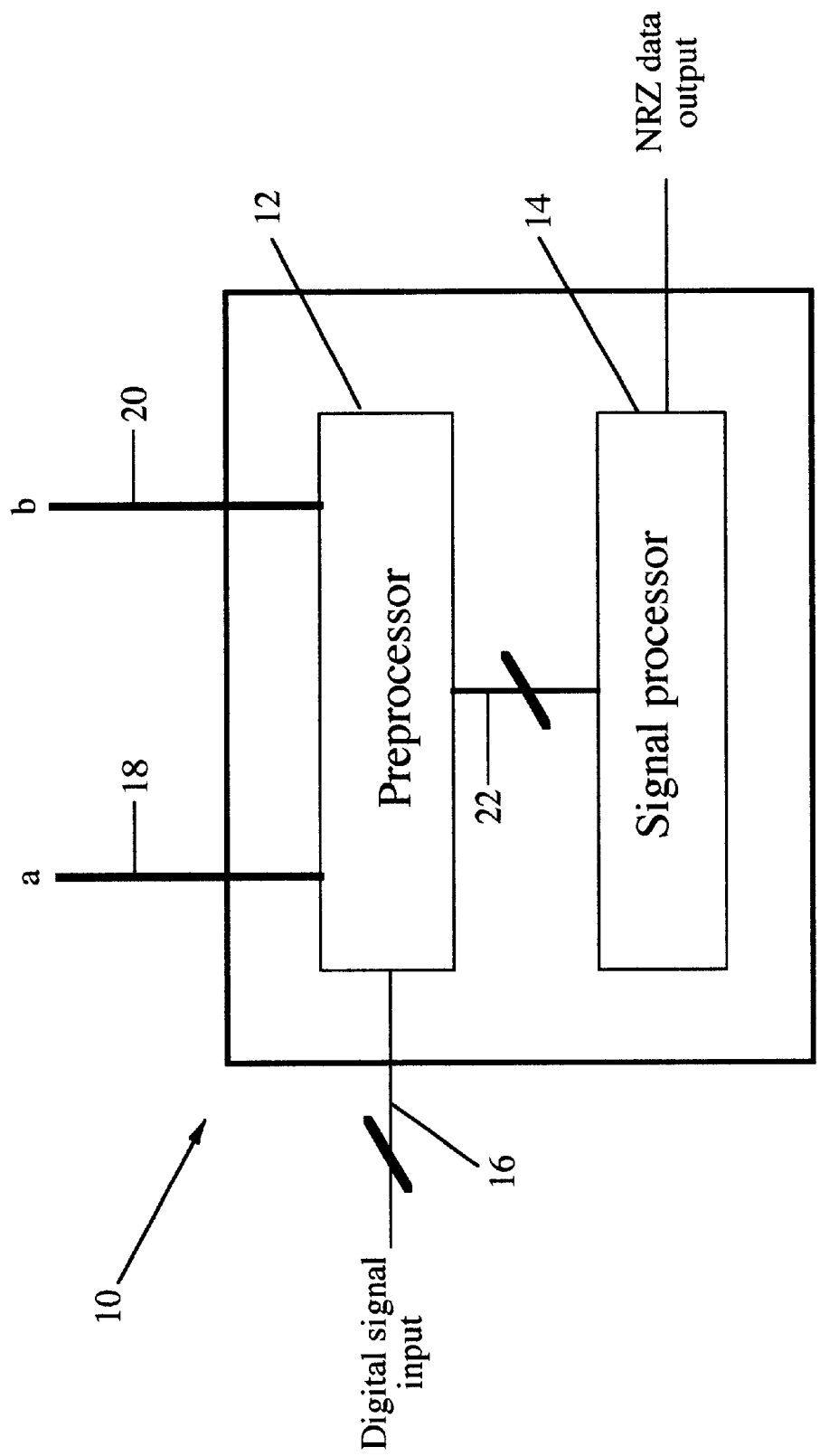
FIG. 1 is a block diagram of one embodiment of the present invention.

FIG. 1 is a block diagram of one embodiment of the present invention.

Referring to FIG. 1, decoder 10 comprises a preprocessor 12, and a signal processor 14. Preprocessor 12 comprises a signal input 16, and two variable inputs 18 and 20. Variable input 18 is labeled "a" and variable input 20 is labeled "b" representing variables "a" and "b" which are coefficients in the impulse response relationship to be disclosed herein. The actual values of the "a" and "b" coefficients are determined by comparing an actual incoming data sequence to the known ideal data sequence, and then setting variables "a" and "b" to values which would minimize the error rate of the output of the decoder as described herein.

The expected range of values of "a" is 0.33±0.1 with 0.33 being the nominal value, and the expected range of values for "b" is 1.0±0.25 with 1.0 being the nominal value.

One possible process for computing "a" and "b" so that the error is minimized is as follows. First, "a" and "b" are set to their nominal values as specified above. Next, a known test pattern is read, and the resulting actual data is processed by the present invention, using the relationships described herein, and a first error rate is computed by determining the number of bit-level differences between the known ideal data and the actual data after processing. One of either "a" or "b" is then perturbed from its nominal value, and the actual data read from the DVD is then reprocessed by the system. A second error rate is then determined using the data resulting from the second instance of processing.

If the error rate increased when the new value of "a" or "b" was used in processing, it is then known that the new value for the particular coefficient was perturbed from its nominal value in the wrong direction. If the error rate for the second instance of processing was lower than the error rate for the first instance of processing, it is known that the new value for the coefficient is more correct than the nominal value.

Once the proper direction for the perturbation for a given coefficient is determined, successive values for that same coefficient may be tested, setting a final value of the coefficient which minimizes the error rate. Once the value of the first coefficient is determined, the value of the second coefficient may then be determined in the same manner.

Other methods for determining coefficients are known to those of ordinary skill in the art, such as the random method, the Fletcher-Powell method, and the Gradient Method. The actual method for determining the value of the coefficients "a" and "b" is not as important as the way in which these coefficients are used.

In this embodiment, digital signal input 16 is a 6-bit wide parallel bus, the input data representing the digitized signal input from a DVD player. As those of ordinary skill in the art will readily recognize, decoder 10 may be designed with any number of bits on the input, without departing from the scope or purpose of the present invention.

Preprocessor 12 is responsible for taking the signal input data from input 16, together with variable inputs 18 and 20, and combining that data into several numerical inputs which are provided to processor 14 which then processes the combined signal and variable inputs, outputting NRZ data for use by other systems.

In order to properly understand how preprocessor and signal processor operate, it is necessary to derive the relationships used to process the digital inputs.

The present invention utilizes a new response relationship $$H(D)=a+(D)+b(D^2)+a(D^3) \tag{R. 2}$$

where a and b are coefficients in the relationship, and where terms having an order higher than shown above in R. 2 are ignored.

As is easily seen from an examination of relationship R. 2 above, the new target response relationship involves the computation of two coefficients rather than four coefficients as would have been required prior art systems.

In order to process data according to the new relationship, it is first necessary to define the possible states that may result from data being read from a DVD. The possible read values $P_k$ are $\{+1$ or $-1\}$ and $P_k$ is the more recently read value, and $P_{k-1}$ was the value read immediately preceding $P_k$, and so on. The "0" read value will be characterized as a "−1" in this specificatio n in o order to preserve the symmetry which exists between the "0" and the "1" read values.

Using the $p_k$ read values defined above, the possible states are defined in Table 1 below where $s_k=(p_{k-1},p_{k-2},p_{k-3})$.

TABLE 1

| State ($S_K$) | $P_{k-1}$ | $P_{k-2}$ | $P_{k-3}$ |
| --- | --- | --- | --- |
| 0 | −1 | −1 | −1 |
| 1 | −1 | −1 | +1 |
| 2 (illegal) | −1 | +1 | −1 |
| 3 | −1 | +1 | +1 |
| 4 | +1 | −1 | −1 |
| 5 (illegal) | +1 | −1 | +1 |
| 6 | +1 | +1 | −1 |
| 7 | +1 | +1 | +1 |

Because the (2,10) decoding scheme allows for a minimum of two "−1" states in a row, a single "−1" state is illegal. States 2 and 5 are therefore illegal because they violate the (2,10) decoding scheme by creating the possibility that a single "−1" data bit might be found.

A perfectly equalized sample for the programmable Partial Response system shown in relationship R. 2 is represented by $$I_k=ap_k+p_{k-1}+bp_{k-2}+ap_{k-3} \tag{R. 3}$$

Figure 2A:
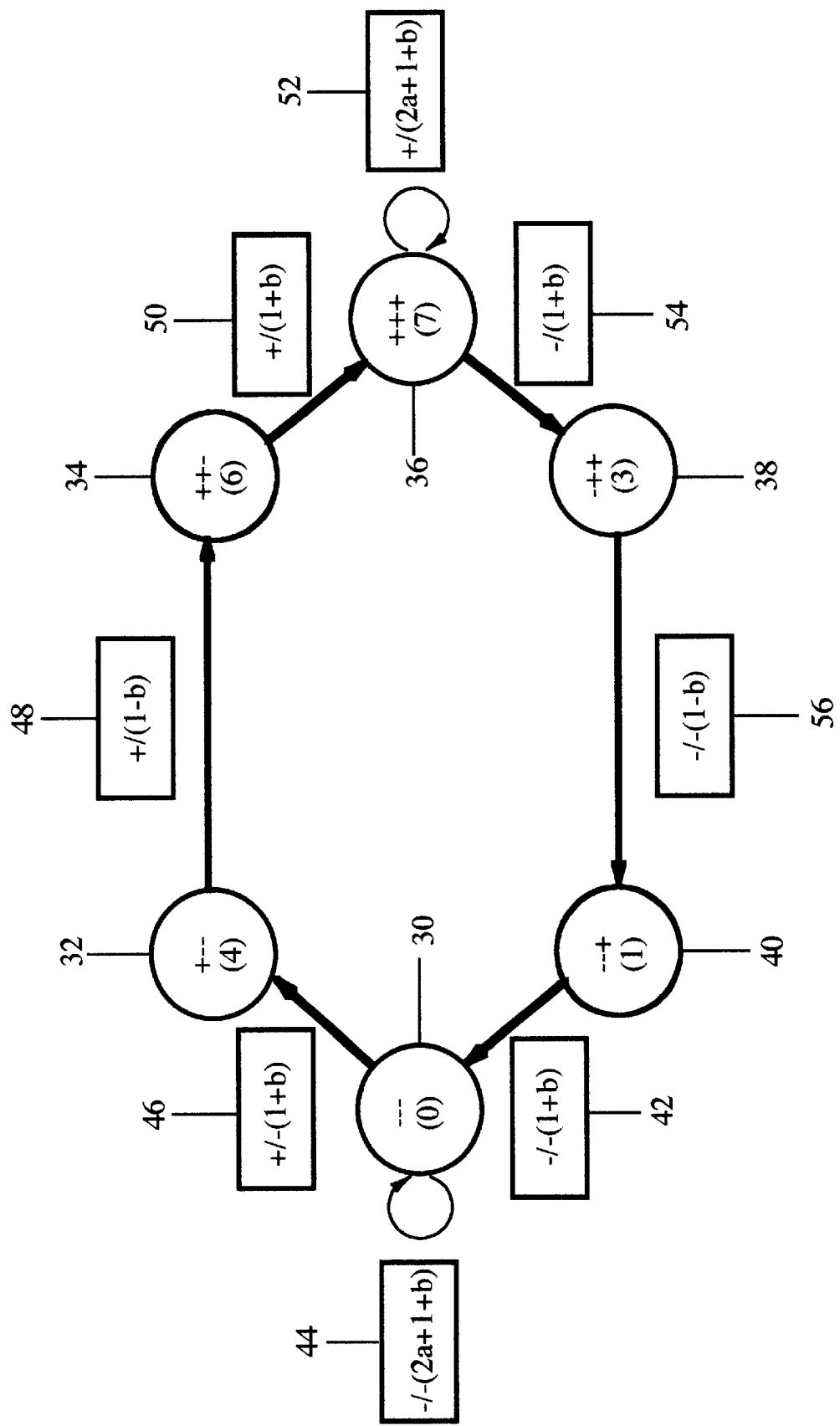
FIG. 2A is a state diagram showing the possible transitions from one state to another.
Figure 2B:
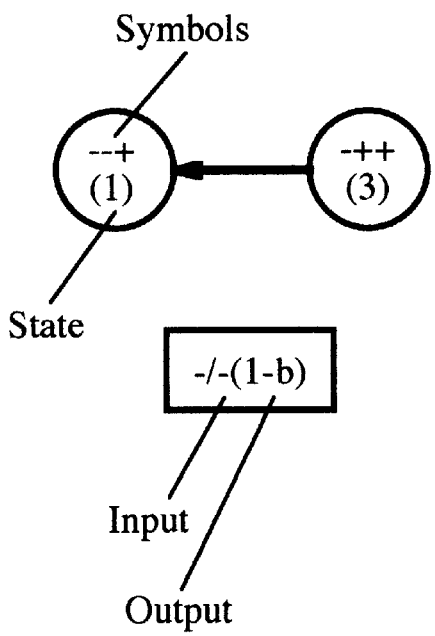
FIG. 2B describes a single state transition according to the schema of FIG. 2A.

FIG. 2A is a state diagram showing the possible transitions from one state to another. FIG. 2B describes a single state transition according to the schema of FIG. 2A.

Referring to FIG. 2A, reference designations 30, 32, 34, 36, 38, 40 represent states 0, 4, 6, 7, 3 and 1 respectively. Transitions between states are represented by boxes having reference designations 42, 44, 46, 48, 50, 52, 54, and 56. In order to fully understand the schema depicted by FIG. 1A, the transition between state 3 (reference designation 18) and state 1 (reference designation 20) will be examined. This transition is represented in FIG. 2B which is a subset of the state diagram of FIG. 2A.

Referring now to FIG. 2B, state 3 is shown having symbols (−++) as previously seen in Table 1. These symbols represent $p_k$, $p_{k-1}$ and $p_{k-2}$, With $p_{k-3}$ having been discarded following the computation of the output of the system when transitioning into state 3.

As is depicted in FIG. 2B, a "−1" (which represents a binary zero, as previously described) is the next piece of data which was read from the DVD. Thus, $p_k=(-1)$, $p_{k-1}=(-1)$, $p_{k-2}=(1)$, and $p_{k-3}=(+1)$. Substituting these values into relationship R. 3 above, we obtain −(1−b). It will be seen later that this result is called $I_k$, and is used by preprocessor 12 to develop one of several inputs to processor 14.

Each of the other allowable state transitions are described using the same symbology, as seen in FIG. 1A.

Note that there are only two transitions where more than one ending state is possible, given the previous state, and the fact that a single −1 data item is not allowed. State (0) may transition to itself, or may instead transition to state (4).

State 7 may also transition to itself, or may instead transition to state (3).

Figure 3A:
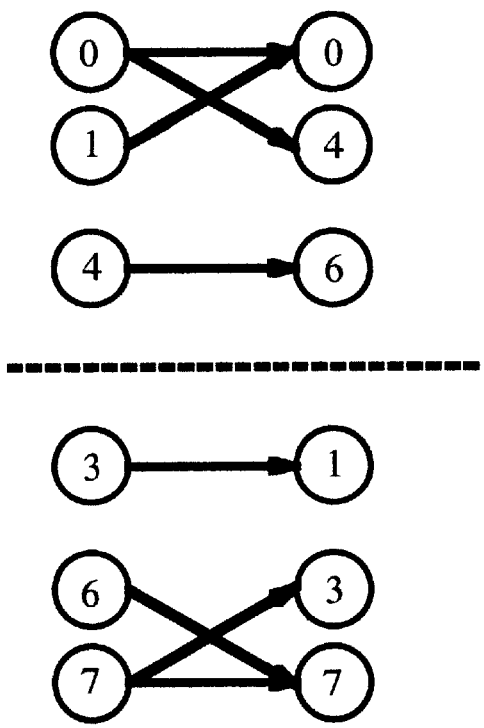
FIG. 3A is a trellis diagram representing the possible transitions from one state to another according to the embodiment of FIG. 1.

FIG. 3A is a trellis diagram representing the possible transitions from one state to another according to the embodiment of FIG. 1.

Referring to FIG. 3A, initial states and ending states of the system are shown in a trellis diagram. By way of example, state (1) may only transition to state (0), i.e. an unconditional branch from state (1) to state (0); state (4) may only transition to state (6), i.e. an unconditional branch from state (4) to state (6); but ending state (0) may be arrived at from either initial state (0) or initial state (1), i.e. a conditional branch from states (0) and (1) to state (0).

In order to determine which branch the system follows, it is necessary to minimize the error between the real system and an idealized target system. The error is defined as the difference between the sample value and the estimated ideal value $I_k$. Therefore, the error is minimum when the sum $[(z_k-I_k)*2]$ is minimized, which is equivalent to the statement that the sum $$BM_k = I_k * (2z_k - I_k) \tag{R. 4}$$

is maximized. The variable $z_k$ represents the 6-bit digital input from digital signal input 16. In R. 4, and in other relationships within the present specification, $z_k$ represents a decimal value between zero (0) (all six bits low) and 63 (all six bits high). Those of ordinary skill in the art would readily recognize that systems which include the present invention may have digital inputs having fewer or more than 6-bits, and that the corresponding range of decimal values would be different then that specified herein.

Relationship R. 4 computes what is called the branch metric at time k. Table 2 below lists the possible branch metrics and the associated $I_k$'s.

TABLE 2

| Branch | $BM_k = I_k(2z_k - I_k)$ | $I_k$ |
|---|---|---|
| 4 to 6 | $(1 - b)[2z_k - (1 - b)]$ | $(1 - b)$ |
| 0 to 4 | $-(1 + b)[2z_k + (1 + b)]$ | $-(1 + b)$ |
| 1 to 0 | $-(1 + b)[2z_k + (1 + b)]$ | $-(1 + b)$ |
| 0 to 0 | $-(2a + 1 + b)[2z_k + (2a + 1 + b)]$ | $-(2a + 1 + b)$ |
| 3 to 1 | $-(1 - b)(2z_k + (1 - b)$ | $-(1 - b)$ |
| 7 to 3 | $(1 + b)[2z_k - (1 + b)]$ | $(1 + b)$ |
| 6 to 7 | $(1 + b)[2z_k - (1 + b)]$ | $(1 + b)$ |
| 7 to 7 | $(2a + 1 + b)[2z_k - (2a + 1 + b)]$ | $(2a + 1 + b)$ |

For a given state to be selected, the path metric (current position metric plus the branch metric to the new state) for the selected state, must be greater than the path metric for the alternative state.

Figure 3B:
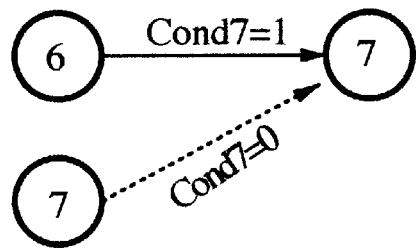
FIGS. 3B and 3C represent the two paths for which a difference metric must be computed to determine the path taken to arrive at a given end state.
Figure 3C:
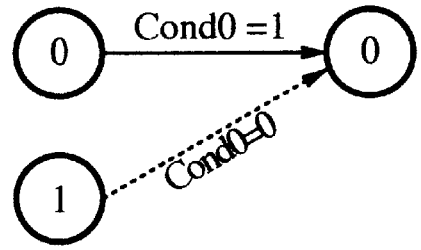

FIGS. 3B and 3C represent the two paths for which a difference metric must be computed to determine the path taken to arrive at a given end state. Because the other transitions are unconditional, the transitions are known and need not be the determined.

With respect to FIG. 3B, it is important to realize that state (0) may result from a previous state (0), or from a previous state (7) depending on whether the new data item is a (+) or a (−). If the path metric plus the branch metric for the transition (0,0), i.e. an initial state (0) to a final state (0), is greater than the path metric plus branch metric for the transition (1,0), i.e. an initial state (1) to a final state (0), then it is determined that the upper branch was taken.

To state the foregoing in relationship form, if $$J_{k-1}(0)+BM_k(0,0)>J_{k-1}(1)+BM_k(1,0) \tag{R. 5}$$

is true, then the upper branch was taken.

If a difference metric is now defined as $DJ_k(i,j)=J_k(i)-J_k(j)$ then relationship R. 5 becomes, after substituting the information from Table 2, $$DJ_{k-1}(1,0)=<-4a(z_k+a+1+b) \tag{R. 6}$$

For ease of discussion, R. 6 will be referred to as Condition 0 (COND 0) Therefore, if COND 0 is true, it shall mean that R. 6 is true.

Now, since $J_k(0)=J_{k-1}(0)+BM_k(0,0)$ (i.e. the current position metric equals the previous metric plus the branch metric), and since $J_k(1)=J_{k-1}(3)+BM_k(3,1)$ If R. 6 is true, a subtraction is performed, obtaining, after reduction, $$DJ_k(1,0)=DJ_{k-1}(3,1)+DJ_{k-1}(1,0)+4(a+b)(z_k+a+1) \tag{R. 7}$$

If R. 6 is false, we obtain, $$DJ_k(1,0)=DJ_{k-1}(3,1)+4b(z_k+1) \tag{R. 8}$$

Just as a result was obtained for COND 0, there exists also a COND 7 which is obtained from computing the result of $$DJ_{k-1}(7,6)=<4a(z_k-1-a-b) \tag{R. 9}$$

For ease of discussion, R. 9 will be referred to as Condition 7 (COND 7) Therefore, if COND 7 is true, it shall mean that R. 9 is true.

Similar difference metric computations as those performed for transitions from state (0) to state (1) may be performed for the transitions from initial states (6) and (7) to a final state (7), obtaining, if R. 9 is true, then $$DJ_k(7,6)=DJ_{k-1}(6,4)+4b(z_k-1) \tag{R. 10}$$

And if R. 9 is false, $$DJ_k(7,6)=DJ_{k-1}(7,6)+DJ_{k-1}(6,4)+4(a+b)(z_k-a-1) \tag{R. 11}$$

It is known that the transition from state (7) to state (3) is unconditional (i.e. the only way to arrive in state (3) is to have state (7) as the initial state), and that the transition from state (7) to state (3) is also unconditional. Therefore, in order to compute $DJ_k(3, 1)$, $$DJ_k(3,1)=DJ_{k-1}(7,6)+DJ_{k-1}(6,3)+BM_K(7,3)-BM_K(3,1)=DJ_{k-1}(7,6)+DJ_{k-1}(6,3)+4(z_k-b) \tag{R. 12}$$

It is known that the transition from state (4) to state (6) is unconditional [i.e. the only way to arrive in state (6) is to have state (4) as the initial state], and that the transition from state (3) to state (7) is also unconditional. Therefore, in order to compute $DJ_k(6,3)$, $$DJ_k(6, 3) = [-DJ_{k-1}(7, 6) - DJ_{k-1}(6, 4) + BM_K(4, 6) - BM_K(7, 3)] \tag{R. 13}$$
$$= [-DJ_{k-1}(7, 6) - DJ_{k-1}(6, 4) - 4b(z_k - 1)]$$

The remaining difference metric to be computed is $DJ_k(6,4)$.

It is known that the transition from state (4) to state (6) is unconditional, i.e. the only way to arrive in state (6) is to have state (4) as the initial state, and that the transition from state (0) to state (4) is also unconditional. Therefore, in order to compute $DJ_k(6,4)$, $$DJ_k(6, 4) = DJ_{k-1}(4, 0) + BM_K(4, 6) - BM_K(0, 4) \tag{R. 14}$$
$$= DJ_{k-1}(4, 1) + DJ_{k-1}(1, 0) + 4(z_k + b)$$

Finally, turning to the computation of $DJ_{k-1}(4,1)$, it is known that the transition from state (0) to state (4) is unconditional, i.e. the only way to arrive in state (4) is to have state (0) as the initial state, and that the transition from state (3) to state (1) is also unconditional. Therefore, in order to compute $DJ_{k-1}(4,1)$, $$DJ_k(4, 1) = [-DJ_{k-1}(3, 0) + BM_K(0, 4) - BM_K(3, 1)] \quad \text{(R. 15)}$$

$$= [-DJ_{k-1}(3, 1) - DJ_{k-1}(1, 0) + 4b(z_k + 1)]$$

Since all of the difference metrics are now known, the determination of the path metrics can now take place, and the state of the system is now known. The state of the system is updated for each new data bit read from the DVD.

Figure 4:
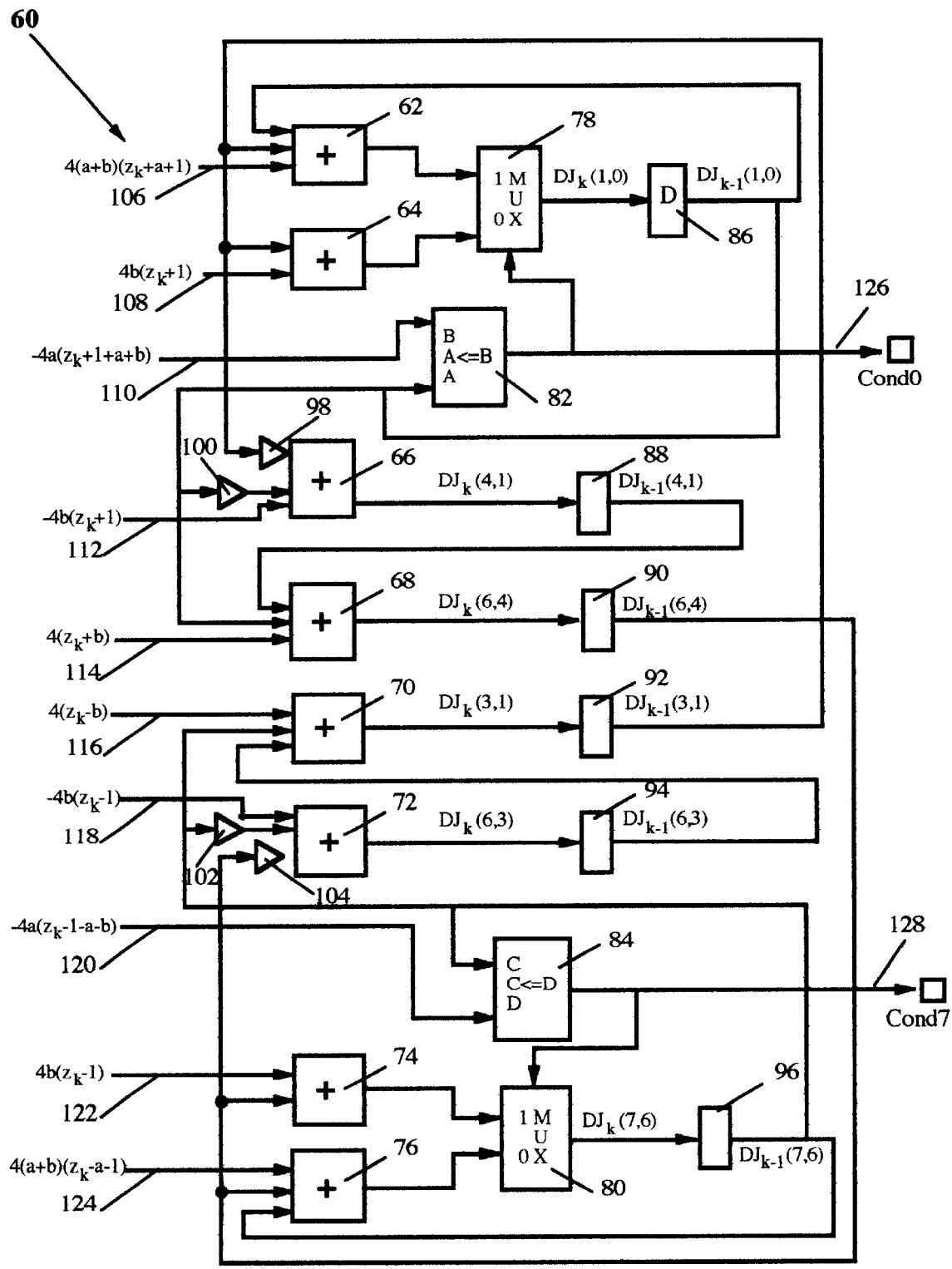
FIG. 4 is a block diagram of an apparatus for determining the difference metrics according to the embodiment of FIG. 1.

FIG. 4 is a block diagram of an apparatus for determining the difference metrics according to the embodiment of FIG. 1.

In the embodiment described herein, components are described which typically require clock signals, power supplies, and other peripheral support signals for their proper operation. The source of these signals and supplies are well-known to those of ordinary skill in the art. Therefore, in an attempt to minimize the complexity of this disclosure, these signals are not described herein.

Referring to FIG. 4, subprocessor 60, a subcomponent of preprocessor 12, comprises adders 62, 64, 66, 68, 70, 72, 74, and 76, multiplexers 78 and 80, comparators 82 and 84, and flip-flops 86, 88, 90, 92, 94, and 96. Inverters 98, 100, 102, and 104 are also present, inverting a result in order to perform a subtraction operation.

The function of subprocessor 60 is to perform the determination of whether COND 0 is true or false, and whether COND 7 is true or false. The results of those determinations are provided to another subsystem, as will be discussed herein. Those of ordinary skill in the art readily recognize that a clock signal (not shown) must also be provided, in order to synchronize the transfer of information through the system.

As can be seen in FIG. 4, the results of the operations performed on incoming signal data are provided to subprocessor 60 as inputs 106, 108, 110, 112, 114, 116, 118, 120, 122, and 124. Those of ordinary skill in the art will readily recognize that there are many ways to configure actual logic circuitry necessary to set up the inputs of subprocessor 60. Therefore, it will only be explained herein, by way of example, and as it well known to persons of ordinary skill in the art, that a typical design might be developed by inputting the proper programming information into a VHDL system, and that VHDL system will provide as an output the design of an application specific integrated circuit (ASIC) which will be equipped to handle the operations.

Adder 62 has three inputs. The first input to adder 62 is input 106 which itself is a parallel input corresponding to the result of performing the relationship $4(a+b)(z_k+a+1)$, where $z_k$ is defined as the actual data read from the DVD, i.e. a "−1, or a "1". The second input to adder 62 is the output of flip-flop 86. The third input to adder 62 is the output of flip-flop 92.

Multiplexer 78 has two data inputs and a control input. The first data input of multiplexer 78 is the output of adder 62. the second data input of multiplexer 78 is the output of adder 64. The control input to multiplexer 78 is the output of comparator 82.

Flip-flop 86 has a single data input which is the output of multiplexer 78.

Adder 64 has two inputs. The first input of adder 64 is input 108 which itself is a parallel input corresponding to the result of performing the relationship $4b(z_k+1)$. The second input to adder 64 is the output of flip-flop 92.

Comparator 82 has two inputs. The first input to comparator 82 is input 110 which itself is a parallel input corresponding to the result of performing the relationship $-4a(z_k+1+a+b)$. The second input to comparator is the output of flip-flop 86.

Adder 66 has three inputs. The first input to adder 66 is the output of flip-flop 92, as inverted by inverter 98. The second input to adder 66 is the output of flip-flop 86, as inverted by inverter 100. The third input to adder 66 is input 112 which itself is a parallel input corresponding to the result of performing the relationship $-4b(z_k+1)$.

Flip-flop 88 has a single data input which is the output of adder 66.

Adder 68 has three inputs. The first input to adder 68 is the output of flip-flop 88. The second input to adder 68 is the output of flip-flop 86. The third input to adder 68 is input 114 which itself is a parallel input corresponding to the result of performing the relationship $4(z_k+b)$.

Flip-flop 90 has a single data input which is the output of adder 68.

Adder 70 has three inputs. The first input to adder 70 is input 116 which itself is a parallel input corresponding to the result of performing the relationship $4(z_k-b)$. The second input to adder 70 is the output of flip-flop 96. The third input to adder 70 is the output of flip-flop 94.

Flip-flop 92 has a single data input which is the output of adder 70.

Adder 72 has three inputs. The first input to adder 66 is input 118 which itself is a parallel input corresponding to the result of performing the relationship $-4b(z_k-1)$. The second input to adder 72 is the output of flip-flop 96, as inverted by inverter 102. The third input to adder 72 is the output of flip-flop 90, as inverted by inverter 104.

Flip-flop 94 has a single data input which is the output of adder 72.

Comparator 84 has two inputs. The first input to comparator 84 is the output of flip-flop 96. The second input to comparator 84 is input 120 which itself is a parallel input corresponding to the result of performing the relationship $-4a(z_k-1-a-b)$.

Adder 74 has two inputs. The first input of adder 74 is input 122 which itself is a parallel input corresponding to the result of performing the relationship $4b(z_k-1)$. The second input to adder 74 is the output of flip-flop 90.

Adder 76 has three inputs. The first input to adder 76 is input 124 which itself is a parallel input corresponding to the result of performing the relationship $4(a+b)(z_k-a-1)$. The second input to adder 76 is the output of flip-flop 90. The third input to adder 76 is the output of flip-flop 96.

Multiplexer 80 has two data inputs and a control input. The first input of multiplexer 80 is the output of adder 74. the second input of multiplexer 80 is the output of adder 76. The control input to multiplexer 80 is the output of comparator 84.

Flip-flop 96 has a single data input which is the output of multiplexer 80.

After performing various operations on the incoming data as seen in the figure and as described previously in this specification, subprocessor 60 provides either a true indication or a false indication for each of COND 0 and COND 7. This true or false indication for each of COND 0 and COND 7 is provided each clock cycle. Therefore, for each clock cycle, six parallel bits of information are received into preprocessor 12 over input lines 16, and each clock cycle following the receipt of the first set of input data true or false logic levels are provided on outputs 126 and 128 of subprocessor 60. In one embodiment, "true" is indicated as a binary one, and "false" is indicated by a binary zero. However, any suitable indication will work, depending on the needs of the designer.

Following the determination of whether COND 0 and COND 7 are individually true or false, the indicators for COND 0 and COND 7 are provided to a path memory.

Figure 5:
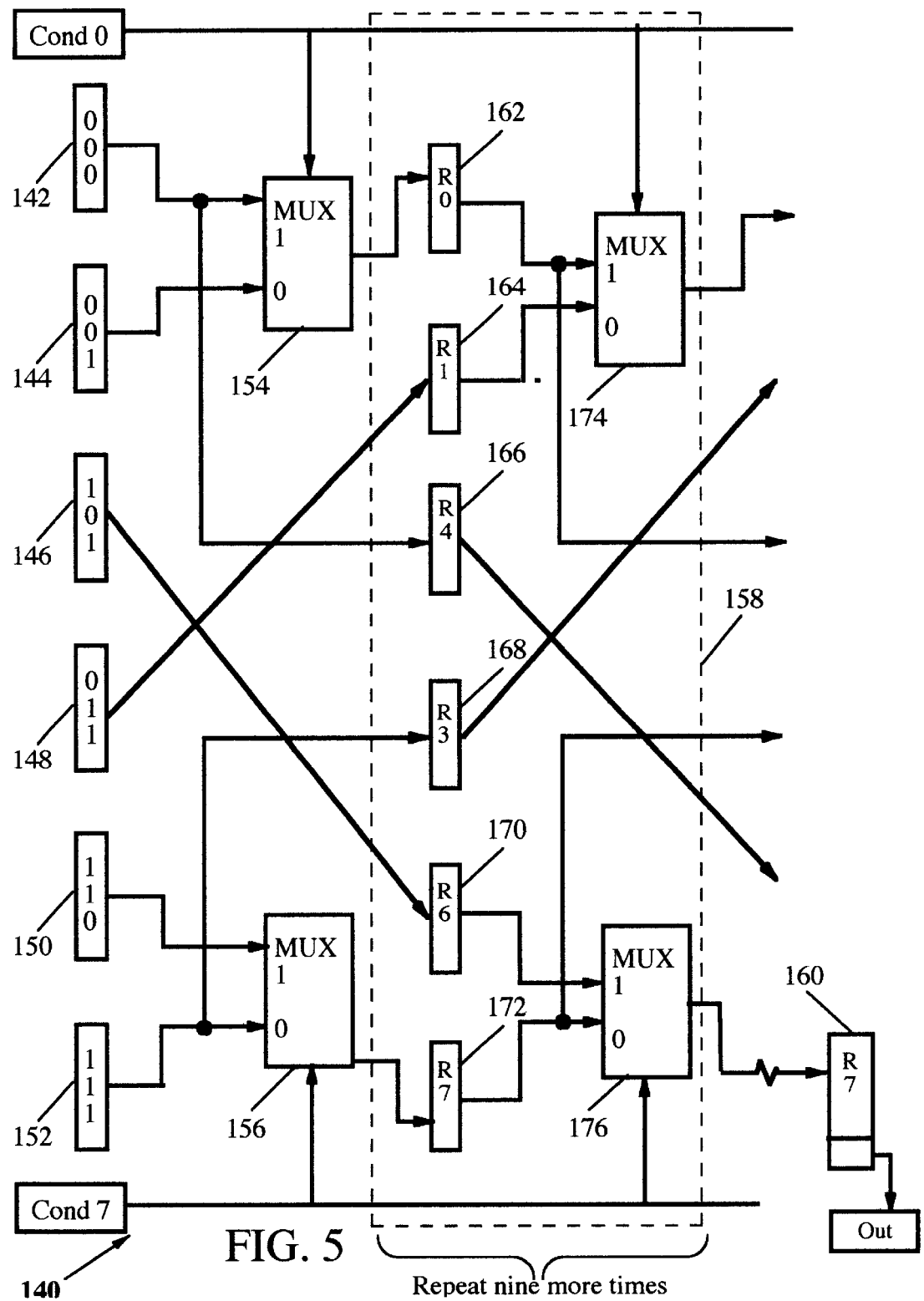
FIG. 5 is a block diagram of a path memory according to the embodiment of FIG. 1.

FIG. 5 is a block diagram of a path memory according to the embodiment of FIG. 1.

Referring to FIG. 5, path memory 140 includes registers 142, 144, 146, 148, 150, and 152, representing states (0), (1), (3), (4), (6), and (7) respectively. In one embodiment, each of registers 142, 144, 146, 148, 150, and 152 is three bits wide, since each state described herein is described by a combination of three data elements.

Path memory 140 further comprises multiplexers 154 and 156. Each clock cycle, the signals 126 and 128 indicating whether COND 0 and COND 7 are true are provided to path memory 140 which are coupled to the control inputs of multiplexers 154 and 156 respectively. Those of ordinary skill in the art readily recognize that a clock signal (not shown) must also be provided, in order to synchronize the transfer of information through the system.

For clarity, the connectivity for the first of the eleven identical stages making up path memory 140 is described herein. All eleven states are identical, except that the NRZ output of eleventh-stage register 160 is provided to the external environment.

Register 142 is preloaded with the three-bit binary value (0,0,0). Register 144 is preloaded with the three-bit binary value (0,0,1). Register 146 is preloaded with the three-bit binary value (1,0,0). Register 148 is preloaded with the three-bit binary value (0,1,1). Register 150 is preloaded with the three-bit binary value (1,1,0). Register 152 is preloaded with the three-bit binary value (1,1,1).

Multiplexer 154 has two data inputs and a control input. The first data input to multiplexer 154 is the output of register 142. The second data input to multiplexer 154 is the output of register 144. The control input to multiplexer 154 is the output 126 from subprocessor 60.

Multiplexer 156 has two data inputs and a control input. The first data input to multiplexer 156 is the output of register 150. The second data input to multiplexer 156 is the output of register 152. The control input to multiplexer 156 is the output 128 from subprocessor 60.

Connectivity between the first stage and the second stage is as follows. Second stage register 162 has a single input which is the output of multiplexer 154. Second stage register 164 has a single input which is the output of register 148. Second stage register 166 has a single input which is the output of register 142. Second stage register 168 has a single input which is the output of register 152. Second stage register 170 has a single input which is the output of register 146. Second stage register 172 has a single input which is the output of multiplexer 156. Just as first stage multiplexers 154 and 156 each have two inputs, second stage multiplexers 174 and 176 have two data inputs and one control input each as previously described for the first stage.

A total of eleven stages identical to stage 158 are connected as recited above with respect to the connectivity between the first and second identical stages.

If COND 0 is true, state (0) transitions back to state (0), and if false, state (3) had transitioned to state (0). Here, that model is indicated in the path memory wherein the contents of first stage register 142 is provided into second stage register 162 if COND 0 is true, and the contents of register 144 is provided into register 162 if COND 0 is false.

If COND 7 is true, state (6) transitions to state (7), and if false, state (7) transitions back to state (7). Here, that model is indicated in the path memory wherein the contents of register 150 is provided into register 172 if COND 7 is true, and the contents of register 152 is provided into register 172 if COND 7 is false.

As previously described, all other transitions from an initial state to a final state are unconditional, and therefore are hardwired, with the contents of an initial state register being provided to the register associated with the final state, as seen on the state diagram of FIG. 2, and the trellis diagram of FIG. 3A.

The output 158 of path memory 140 is also the NRZ output of decoder 10 of FIG. 1. Therefore, the output of the present invention is a single NRZ bit, for every parallel input of six bits received by preprocessor 12, and one output bit is provided for each system clock cycle.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An apparatus for processing a digitized analog signal read from a DVD media and provided to a digital processing system, the apparatus comprising:

a DVD reading apparatus having an output, said DVD reading apparatus for providing a signal comprised of a stream of actual data read from a DVD media; and a processor coupled to the output of said DVD reading apparatus the processor for determining, based upon the comparison of actual data to the known ideal contents of said data on said DVD media, the magnitude of no more than two variables, said two variables representing at least three coefficients in an impulse response equation which models the digital processing system, the magnitude of said no more than two variables being determined so that the error rate between said first and said second sets of data is minimized.

2. The apparatus of claim 1 further comprising:

a difference metric computing apparatus for computing path metrics for conditional transitions between first and second possible initial states and a third final state, said path metrics being dependant upon the magnitude of said no more than two variables; and a path memory for determining, based upon the results of the computation of said path metrics, a next state of the system, said next state having a path metric which is shorter than than the path metric for all alternative paths from all other initial states.

3. An apparatus for processing a digitized analog signal read from a DVD media and provided to a digital processing system, the apparatus comprising:

means for forming a first set of data from actual data read from a location on a DVD media, said location containing a known test data sequence;

means for forming a second set of data comprising the known data bits making up said known test data sequence;

means for comparing said first set of data to said second set of data; and means for determining the magnitude of no more than two variables, said two variables representing at least three coefficients in an impulse response equation which models the digital processing system, the magnitude of said no more than two variables being determined so that the error rate between said first and said second sets of data is minimized.

4. The apparatus of claim 3 further comprising:

means for reading actual data from said DVD media, said actual data comprising numerical values representing the magnitude of an analog signal stored on said DVD media;

means for processing said actual data according to said impulse response equation having at least three coefficients represented by no more than two variables, said processing resulting in an NRZ signal representing said actual data in NRZ format; and means for outputting said NRZ signal.

5. The apparatus of claim 3 further comprising:

means for defining at least two possible states pertaining to said impulse response equation;

means for reading, from a DVD media, at least eleven discrete numerical values representing the amplitude of an analog signal;

means for computing, for each of said at least eleven discrete numerical values, a difference metric for the transitions between allowed transitions from each of said at least two possible states to each other state, said difference metric being the sum of the path metric for the initial state and the branch metric for the transition from said initial state to a final state;

means for determining, for each of said transitions having identical ending states, what the initial state of each transition is by comparing the difference metric for each of said transitions and setting the initial state to be that initial state within the set of possible initial states for that final state which has the shortest difference metric; and means for outputting, beginning immediately following the eleventh cycle of said determining step and continuing for at least eleven cycles thereafter, NRZ data corresponding to said at least eleven discrete numerical values.

6. The apparatus of claim 5 wherein said at least two possible states is further defined as eight states.

7. A computer system for processing a digitized analog signal read from a DVD media, the computer system comprising:

a processor; and a memory having stored therein the following means for forming a first set of data from actual data read from a location on a DVD media, said location containing a known test data sequence;

means for forming a second set of data comprising the known data bits making up said known test data sequence;

means for comparing said first set of data to said second set of data; and means for determining the magnitude of no more than two variables, said two variables representing at least three coefficients in an impulse response equation which models the digital processing system, the magnitude of said no more than two variables being determined so that the error rate between said first and said second sets of data is minimized.

8. The computer system according to claim 7, the memory further having stored therein the following:

means for reading actual data from said DVD media, said actual data comprising numerical values representing the magnitude of an analog signal stored on said DVD media;

means for processing said actual data according to said impulse response equation having at least three coefficients represented by no more than two variables, said processing resulting in an NRZ signal representing said actual data in NRZ format; and means for outputting said NRZ signal.

9. The computer system according to claim 7, the memory further having stored therein the following:

means for defining at least two possible states pertaining to said impulse response equation;

means for reading, from a DVD media, at least eleven discrete numerical values representing the amplitude of an analog signal;

means for computing, for each of said at least eleven discrete numerical values, a difference metric for the transitions between allowed transitions from each of said at least two possible states to each other state, said difference metric being the sum of the path metric for the initial state and the branch metric for the transition from said initial state to a final state;

means for determining, for each of said transitions having identical ending states, what the initial state of each transition is by comparing the difference metric for each of said transitions and setting the initial state to be that initial state within the set of possible initial states for that final state which has the shortest difference metric; and means for outputting, beginning immediately following the eleventh cycle of said determining step and continuing for at least eleven cycles thereafter, NRZ data corresponding to said at least eleven discrete numerical values.

10. The computer system of claim 9 wherein said at least two possible states is further defined as eight states.

* * * * *